United States Patent
Attarwala et al.

(10) Patent No.: US 9,944,830 B2
(45) Date of Patent: Apr. 17, 2018

(54) TOUGHENED CYANOACRYLATE COMPOSITIONS

(71) Applicant: Henkel IP & Holding GmbH, Duesseldorf (DE)

(72) Inventors: Shabbir Attarwala, Simsbury, CT (US); Rosa Matilde Davila, Sabana Grande, PR (US); Benjamin M. Surowiecki, Jr., Cheshire, CT (US); Stan Wojciak, New Britain, CT (US); Roger James Grismala, Enfield, CT (US); Ling Li, Glastonbury, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 15/291,371

(22) Filed: Oct. 12, 2016

(65) Prior Publication Data
US 2017/0051182 A1 Feb. 23, 2017

Related U.S. Application Data

(63) Continuation of application No. 14/663,825, filed on Mar. 20, 2015, which is a continuation of application (Continued)

(51) Int. Cl.
*C09J 4/06* (2006.01)
*C09J 9/00* (2006.01)
(Continued)

(52) U.S. Cl.
CPC .......... *C09J 4/06* (2013.01); *B32B 37/12* (2013.01); *C09J 5/00* (2013.01); *C09J 9/00* (2013.01);
(Continued)

(58) Field of Classification Search
CPC ........................................................ C09J 4/06
See application file for complete search history.

(56) References Cited

U.S. PATENT DOCUMENTS 3,988,299 A * 10/1976 Malofsky .................. C09J 4/00
156/332
4,440,910 A   4/1984 O'Connor
(Continued)

FOREIGN PATENT DOCUMENTS

EP    0449456 A1   10/1991
EP    1124159 B1    3/2003
(Continued)

OTHER PUBLICATIONS

H.V. Coover, D.W. Dreifus and J.T. O'Connor, "Cyanoacrylate Adhesives" in Handbook of Adhesives, 27, p. 463-77, I. Skeist, ed., Van Nostrand Reinhold, New York, 3rd ed., 1990.
(Continued)

*Primary Examiner* — Daniel H Lee
(74) *Attorney, Agent, or Firm* — Steven C. Bauman

(57) ABSTRACT

This invention relates to cyanoacrylate-containing compositions that include, in addition to the cyanoacrylate component, a rubber toughening component, which is substantially clear and colorless and which is substantially free of release agents and anti-oxidants known to impair the fixture speeds and shelf life stability of cyanoacrylate compositions to which they are added. As a result, the inventive rubber cyanoacrylate adhesive compositions demonstrate improved properties, such as fixture speed, strength and shelf life under accelerated aging conditions.

14 Claims, 2 Drawing Sheets

Related U.S. Application Data

No. 11/995,043, filed as application No. PCT/US2006/027031 on Jul. 11, 2006, now abandoned.

(60) Provisional application No. 60/698,111, filed on Jul. 11, 2005.

(51) Int. Cl.

| | | |
|---|---|---|
| C09J 11/06 | (2006.01) | |
| C09J 11/04 | (2006.01) | |
| C09J 5/00 | (2006.01) | |
| B32B 37/12 | (2006.01) | |
| C09J 123/08 | (2006.01) | |
| C08K 3/04 | (2006.01) | |
| C08K 3/36 | (2006.01) | |
| C08K 5/092 | (2006.01) | |
| C08K 5/1539 | (2006.01) | |
| C08K 5/159 | (2006.01) | |
| C08K 5/10 | (2006.01) | |
| C08K 5/3415 | (2006.01) | |
| C08F 222/32 | (2006.01) | |

(52) U.S. Cl.
CPC ............... *C09J 11/04* (2013.01); *C09J 11/06* (2013.01); *C09J 123/0869* (2013.01); *B32B 2307/558* (2013.01); *C08F 222/32* (2013.01); *C08K 3/04* (2013.01); *C08K 3/36* (2013.01); *C08K 5/092* (2013.01); *C08K 5/10* (2013.01); *C08K 5/159* (2013.01); *C08K 5/1539* (2013.01); *C08K 5/3415* (2013.01); *C09J 2433/00* (2013.01)

(56) References Cited

U.S. PATENT DOCUMENTS

| 4,450,265 | A | * | 5/1984 | Harris .................. C09J 4/00 |
| | | | | 526/204 |
| 4,556,700 | A | | 12/1985 | Harris et al. |
| 4,560,723 | A | | 12/1985 | Millet et al. |
| 4,622,414 | A | | 11/1986 | McKervey |
| 4,636,539 | A | | 1/1987 | Harris et al. |
| 4,695,615 | A | | 9/1987 | Leonard et al. |
| 4,718,966 | A | | 1/1988 | Harris et al. |
| 4,837,260 | A | | 6/1989 | Sato et al. |
| 4,855,461 | A | | 8/1989 | Harris |
| 4,906,317 | A | | 6/1990 | Liu |
| 5,288,794 | A | | 2/1994 | Attarwala |
| 5,306,752 | A | | 4/1994 | Attarwala |
| 5,312,864 | A | | 5/1994 | Wenz et al. |
| 5,328,944 | A | | 7/1994 | Attarwala et al. |
| 5,424,343 | A | | 6/1995 | Attarwala |
| 5,424,344 | A | | 6/1995 | Lewin |
| 5,530,037 | A | * | 6/1996 | McDonnell .......... A61L 2/081 |
| | | | | 514/527 |
| 5,739,205 | A | | 4/1998 | Nishino et al. |
| 5,922,783 | A | | 7/1999 | Wojciak |
| 5,994,464 | A | | 11/1999 | Ohsawa et al. |
| 6,093,780 | A | | 7/2000 | Attarwala |
| 6,475,331 | B1 | | 11/2002 | O'Connor et al. |
| 6,607,632 | B1 | | 8/2003 | McDonnell et al. |
| 6,822,052 | B2 | | 11/2004 | Woods et al. |
| 6,835,789 | B1 | | 12/2004 | Kneafsey et al. |
| 2003/0162857 | A1 | * | 8/2003 | Wojciak .................. C08F 22/32 |
| | | | | 522/7 |
| 2003/0208002 | A1 | * | 11/2003 | Woods .................... C08F 8/30 |
| | | | | 525/295 |
| 2006/0094833 | A1 | | 5/2006 | McDonnell et al. |

FOREIGN PATENT DOCUMENTS

| JP | 59-66473 | | 4/1984 |
| JP | 63-3072 | A | 1/1988 |
| JP | 64-20206 | A | 1/1989 |
| JP | 3-290484 | A | 12/1991 |
| JP | 4-75268 | B2 | 11/1992 |
| JP | 7-30292 | B2 | 4/1995 |
| JP | 8-143823 | A | 6/1996 |
| JP | 9-249708 | A | 9/1997 |
| JP | 2000-290599 | A | 10/2000 |
| WO | 83/02450 | A1 | 7/1983 |
| WO | 0200801 | A1 | 1/2002 |

OTHER PUBLICATIONS

G.H. Millet, "Cyanoacrylate Adhesives" in Structural Adhesives: Chemistry and Technology, p. 249-307 S.R. Hartshorn, ed., Plenun Press, New York, 1986.

\* cited by examiner

TOUGHENED CYANOACRYLATE COMPOSITIONS

BACKGROUND OF THE INVENTION

Field of the Invention

This invention relates to cyanoacrylate compositions that include, in addition to the cyanoacrylate component, a rubber toughening component, which is substantially clear and colorless and which is substantially free of release agents and anti-oxidants known to impair the fixture speeds and shelf life stability of cyanoacrylate compositions to which they are added. As a result, the inventive rubber toughened cyanoacrylate compositions demonstrate improved properties, such as fixture speed, strength and shelf life under accelerated aging conditions.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

One group of elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer.

Henkel Corporation (as the successor to Loctite Corporation) has sold for a number of years since the filing of the '910 patent rubber toughened cyanoacrylate adhesive products under the tradename BLACK MAX, which employ as the rubber toughening component the DuPont materials called VAMAC B-124 and N123. In addition, Henkel has sold in the past clear and substantially colorless rubber toughened cyanoacrylate adhesive products, namely, LOCTITE 4203, 4204 and 4205, which employ as the rubber toughening component the DuPont material, VAMAC G.

While VAMAC G contains no fillers to provide color or stabilizers, it does contain processing aids. These processing aids—or release systems—are reported to be ARMEEN 18D and stearic acid in combination with GAFAC RL-210 (or with VANFRE UN, ZELEC UN or SERVOXYL VPAZ-100). In addition, it is believed that polyethylene glycol ether wax is also used as a processing aid. Waxes such as this interfere with the physical properties of cyanoacrylate compositions.

VAMAC VCS rubber appears to be the base rubber, from which the remaining members of the VAMAC product line are compounded. VAMAC VCS is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above.

Thus, notwithstanding the state-of-the-technology and the commercial success experienced by Henkel Corporation with its line of rubber toughened cyanoacrylate adhesive products (such as LOCTITE BLACK MAX 380 and 480 and LOCTITE 4203, 4204 and 4205), it would be desirable to provide a substantially clear and colorless rubber toughened cyanoacrylate composition, which demonstrates improved fixturing speed and shelf life stability compared to known rubber toughened cyanoacrylates.

SUMMARY OF THE INVENTION

The present invention is thus directed to a rubber toughened cyanoacrylate adhesive composition, which includes beyond the cyanoacrylate component, a rubber toughening component having (a) reaction products of the combination of ethylene, methyl acrylate and monomers having carboxylic acid cure sites, (b) dipolymers of ethylene and methyl acrylate, and combinations of (a) and (b), which once the reaction products and/or dipolymers are formed are then substantially free of processing aids, such as the release agents octadecyl amine (reported by DuPont to be available commercially from Akzo Nobel under the tradename ARMEEN 18D), complex organic phosphate esters (reported by DuPont to be available commercially from R.T. Vanderbilt Co., Inc. under the tradename VANFRE VAM), stearic acid and/or polyethylene glycol ether wax, and anti-oxidants, such as substituted diphenyl amine (reported by DuPont to be available commercially from Uniroyal Chemical under the tradename NAUGARD 445).

The processing aids and anti-oxidants used to compound reactions products of these components are typically found in the VAMAC acrylic rubbers available from DuPont, such as VAMAC G or VAMAC B-124. These VAMAC acrylic rubber products when used together with cyanoacrylates have a tendency to destabilize the cyanoacrylate on the one hand (thus resulting in a shorter shelf life as the cyanoacrylate becomes more reactive) and to retard fixture speed on the other hand. Neither of these affects are particularly desirable.

While LOCTITE 4203, 4204 and 4205 are each substantially clear and colorless rubber toughened cyanoacrylate adhesive products made with VAMAC G, the presence of the release agents and anti-oxidants in the VAMAC product, sometimes leads to the adverse affects noted in the preceding paragraph.

The inclusion of the rubber toughening agent noted above that is not compounded with such release agents and anti-oxidants into a cyanoacrylate composition provides for demonstrated improved properties, such as fixture speeds, shear strengths, fracture toughness and shelf life, when compared to the BLACK MAX products or LOCTITE 4203, 4204 and 4205, and at least comparable fixture speeds and shelf life when compared to non-rubber toughened, thickened cyanoacrylate adhesive products, such as LOCTITE PRISM 401.

In another aspect of this invention, a radiation-curable composition is provided which includes a cyanoacrylate component or a cyanoacrylate-containing formulation, a metallocene component, a photoinitiator, and a rubber toughening component comprising (a) reaction products of the combination of ethylene, methyl acrylate and monomers having carboxylic acid cure sites, (b) dipolymers of ethylene and methyl acrylate, and combinations of (a) and (b), which once the reaction products and/or dipolymers are formed are then substantially free of processing aids, such as the release agents octadecyl amine, complex organic phosphate esters, stearic acid and/or polyethylene glycol ether wax, and anti-oxidants, such as substituted diphenyl amine.

This invention is also directed to a method of bonding together two substrates, which method includes applying to at least one of the substrates a composition as described above, and thereafter mating together the substrates. The method, when using the radiation-curable composition as so defined, may be used where at least one of the substrates is substantially transmissive to the radiation used to cure the composition.

In addition, the present invention is directed to reaction products of the inventive compositions.

Also, the invention is directed to a method of preparing the inventive compositions.

And the invention is directed to a method of conferring one or more of the following properties to rubber toughened cyanoacrylate compositions improved shelf life, fixture speed, improved shear strength development over time, and improved side impact strength and fracture toughness, which method includes the steps of providing a cyanoacrylate composition, providing a rubber toughening agent of (a) reaction products of the combination of ethylene, methyl acrylate and monomers having carboxylic acid cure sites or (b) dipolymers of ethylene and methyl acrylate (or combinations thereof), and being substantially free of processing acids and/or anti-oxidants, and mixing together the cyanoacrylate compositions and rubber toughening agents.

The invention will be more fully understood by a reading of the section entitled "Detailed Description of the Invention", which follows.

DETAILED DESCRIPTION OF THE INVENTION

Figure 1:
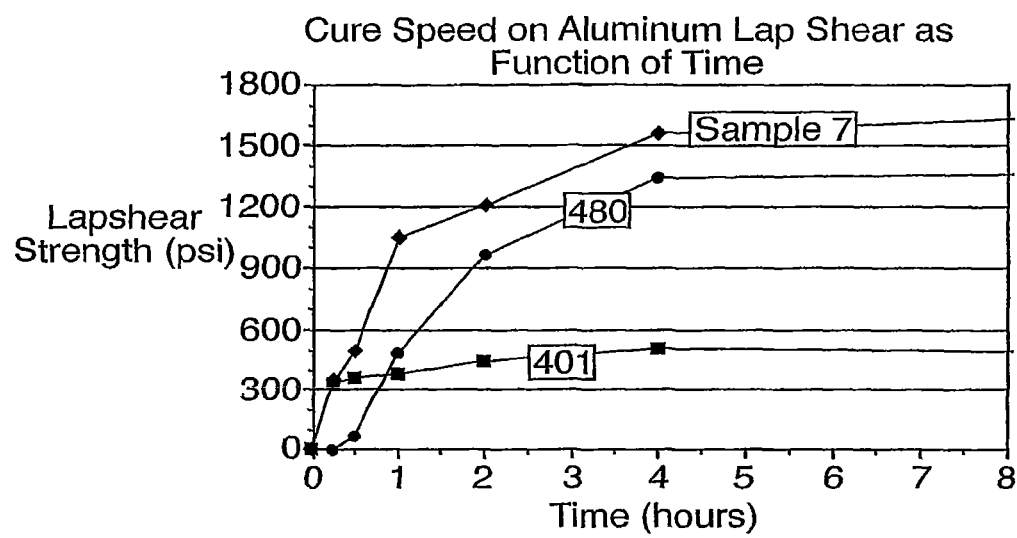
FIG. 1 depicts a plot of the development of lap shear strength overtime for an invention composition compared with two control products on aluminum substrates.

As noted above, this invention is directed to a rubber toughened cyanoacrylate adhesive composition, which includes beyond the cyanoacrylate component, a rubber toughening component having (a) reaction products of the combination of ethylene, methyl acrylate and monomers having carboxylic acid cure sites, (b) dipolymers of ethylene and methyl acrylate, and combinations of (a) and (b), which once the reaction products and/or dipolymers are formed are then substantially free of processing aids, such as octadecyl amine (reported by DuPont to be available commercially from Akzo Nobel under the tradename, ARMEEN 18D), complex organic phosphate esters (reported by DuPont to be available commercially from R.T. Vanderbilt Co., Inc. under the tradename, VANFRE VAN), stearic acid and/or polyethylene glycol ether wax and anti-oxidants, such as substituted diphenyl amine (reported by DuPont to be available commercially from Uniroyal Chemical under the tradename NAUGARD 445).

The cyanoacrylate component includes cyanoacrylate monomers which may be chosen with a raft of substituents, such as those represented by $H_2C=C(CN)$—COOR, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate.

The cyanoacrylate component should be included in the compositions in an amount within the range of from about 50% to about 98% by weight, with the range of about 75% to about 95% by weight being desirable, and about 85 to about 90% by weight of the total composition being particularly desirable.

The rubber toughening component is a reaction product of the combination of ethylene, methyl acrylate and monomers having carboxylic acid cure sites, which once formed is then substantially free of processing aids and anti-oxidants. The processing aids are release agents such as octadecyl amine (reported by DuPont to be available commercially from Akzo Nobel under the tradename ARMEEN 18D), complex organic phosphate esters (reported by DuPont to be available commercially from R.T. Vanderbilt Co., Inc. under the tradename VANFRE VAM), stearic acid and/or polyethylene glycol ether wax. The anti-oxidant is a substituted diphenyl amine (reported by DuPont to be available commercially from Uniroyal Chemical under the tradename NAUGARD 445).

Alternatively, the rubber toughening component is a dipolymer of ethylene and methyl acrylate, which once formed is then substantially free of processing aids and anti-oxidants. Of course, the rubber toughening component may be a combination of the reaction product of the preceding paragraph and the dipolymer of this paragraph.

The rubber toughening component should be present in a concentration of about 1.5% to about 20% by weight, such as about 5% to about 15% by weight, with about 8% to about 10% being particularly desirable.

A variety of organometallic materials are also suitable for use herein. Those materials of particular interest herein may be represented by metallocenes within structure I:

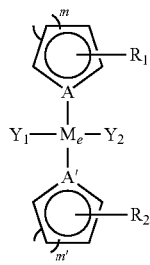

I where $R_1$ and $R_2$ may be the same or different and may occur at least once and up to as many four times on each ring in the event of a five-membered ring and up to as many as five times on each ring in the event of a six-membered ring;

$R_1$ and $R_2$ may be selected from H; any straight- or branched-chain alkyl constituent having from 1 to about 8 carbon atoms, such as $CH_3$, $CH_2CH_3$, $CH_2CH_2CH_3$, $CH(CH_3)_2$, $C(CH_3)_3$ or the like; acetyl; vinyl; allyl; hydroxyl; carboxyl; —$(CH_2)_n$—OH, where n may be an integer in the range of 1 to about 8; —$(CH_2)_n$—$COOR_3$, where n may be an integer in the range of 1 to about 8 and $R_3$ may be any straight- or branched-chain alkyl constituent having from 1 to about 8 carbon atoms; H; Li; Na; or —$(CH_2)_{n'}$, where n' may be an integer in the range of 2 to about 8; —$(CH_2)_n$—$OR_4$, wherein n may be an integer in the range of 1 to about 8 and $R_4$ may be any straight- or branched-chain alkyl constituent having from 1 to about 8 carbon atoms; or —$(CH_2)_n$—$N^+(CH_3)_3X^-$, where n may be an integer in the range of 1 to about 8 and X may be $Cl^-$, $Br^-$, $I^-$, $ClO_4^-$ or $BF_4^-$;

$Y_1$ and $Y_2$ may not be present at all, but when at least one is present they may be the same or different and may be selected from H, $Cl^-$, $Br^-$, $I^-$, cyano, methoxy, acetyl, hydroxy, nitro, trialkylamines, triaryamines, trialkylphosphines, triphenylamine, tosyl and the like;

A and A' may be the same or different and may be C or N;

m and m' may be the same or different and may be 1 or 2; and $M_e$ is Fe, Ti, Ru, Co, Ni, Cr, Cu, Mn, Pd, Ag, Rh, Pt, Zr, Hf, Nb, V, Mo and the like.

Of course, depending on valence state, the element represented by $M_e$ may have additional ligands—$Y_1$ and $Y_2$—associated therewith beyond the carbocyclic ligands depicted above (such as where $M_e$ is Ti and $Y_1$ and $Y_2$ are $Cl^-$).

Alternatively, metallocene structure I may be modified to include materials such as:

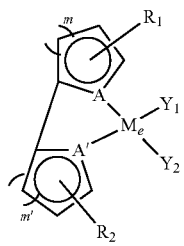

where $R_1$, $R_2$, $Y_1$, $Y_2$, A, A', m, m' and $M_e$ are as defined above. A particularly desirable example of such a material is where $R_1$ and $R_2$ are each H; $Y_1$ and $Y_2$ are each Cl; A and A' are each N; m and m' are each 2 and $M_e$ is Ru.

Within metallocene structure I, well-suited metallocene materials may be chosen from within metallocene structure II:

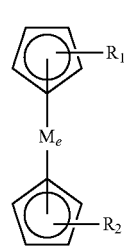

II where $R_1$, $R_2$ and $M_e$ are as defined above.

Particularly well-suited metallocene materials from within structure I may be chosen where $R_1$, $R_2$, $Y_1$, $Y_2$, m and m' are as defined above, and $M_e$ is chosen from Ti, Cr, Cu, Mn, Ag, Zr, Hf, Nb, V and Mo.

Desirably, the metallocene is selected from ferrocenes (i.e., where $M_e$ is Fe), such as ferrocene, vinyl ferrocenes, ferrocene derivatives, such as butyl ferrocenes or diarylphosphino metal-complexed ferrocenes [e.g., 1,1-bis (diphenylphosphino) ferrocene-palladium dichloride], titanocenes (i.e., where $M_e$ is Ti), such as bis($\eta^5$-2,4-cyclopentadien-1-yl)-bis-[2,6-difluoro-3-(1H-pyrrol-1-yl)phenyl] titanium which is available commercially from Ciba Specialty Chemicals, Tarrytown, N.Y. under the tradename "IRGACURE" 784DC, and derivatives and combinations thereof. A particularly desirable metallocene is ferrocene.

And bis-alkylmetallocenes, for instance, bis-alkylferrocenes (such as diferrocenyl ethane, propanes, butanes and the like) are also desirable for use herein, particularly since about half of the equivalent weight of the material (as compared to a non-bis-metallocene) may be employed to obtain the sought-after results, all else being unchanged. Of the these materials, diferrocenyl ethane is particularly desirable.

Of course, other materials may be well-suited for use as the metallocene component. For instance, $M_e[CW_3$—CO—CH—C(O^-)—CW'_3]_2$, where $M_e$ is as defined above, and W and W' may be the same or different and may be selected from H, and halogens, such as F and Cl. Examples of such materials include platinum (II) acetyl acetonate ("PtACAC"), cobalt (II) acetyl acetonate ("CoACAC"), nickel (II) acetyl acetonate ("NiACAC") and copper (II) acetyl acetonate ("CuACAC"). Combinations of those materials may also be employed.

A number of photoinitiators may be employed herein to provide the benefits and advantages of the present invention to which reference is made above. Photoinitiators enhance the rapidity of the curing process when the photocurable compositions as a whole are exposed to electromagnetic radiation. Certain metallocenes, such as "IRGACURE" 784DC, may serve a dual purpose as both metallocene and photoinitiator.

Examples of suitable photointiators for use herein include, but are not limited to, photoinitiators available commercially from Ciba Specialty Chemicals, Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4-,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof.

Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), bis(2,4,6-trimethyl benzoyl) phenyl phosphine oxide (e.g., "IRGACURE" 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC).

Accelerators may also be included in the inventive rubber toughened cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the following structure are useful herein:

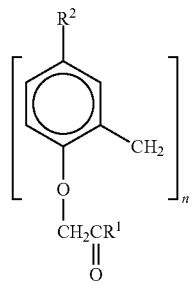

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination, or in combination with other first accelerator

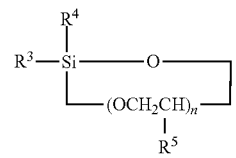

include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5,6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the following structure:

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

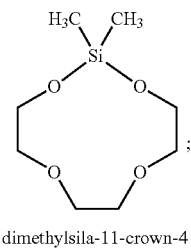

dimethylsila-11-crown-4

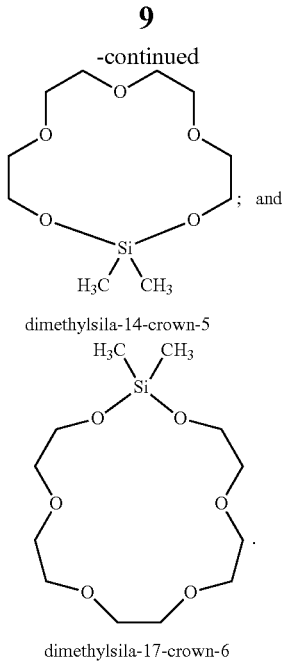

dimethylsila-14-crown-5 dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

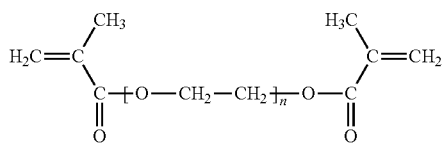

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

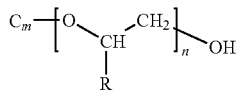

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of materials within the above structure include those offered under the DEHYDOL tradename from Henkel KGaA, Dusseldorf, Germany, such as DEHYDOL 100.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included in the inventive rubber toughened cyanoacrylate compositions to confer additional physical properties, such as improved shock resistance, thickness (for instance, polymethyl methacrylate), thixotropy (for instance fumed silica), color, and enhanced resistance to thermal degradation [for instance, maleimide compounds such as N,N'-meta-phenylene bismaleimide (see U.S. Pat. No. 3,988,299 (Malofsky)), certain mono, poly or hetero aromatic compounds characterized by at least three substitutions on an aromatic ring thereof, two or more of which being electron withdrawing groups (U.S. Pat. No. 5,288,794 (Attarwala)), certain quinoid compounds (U.S. Pat. No. 5,306,752 (Attarwala)), certain sulfur-containing compounds, such as an anhydrosulfite, a sulfoxide, a sulfite, a sulfonate, a methanesulfonate or a p-toluenesulfonate (U.S. Pat. No. 5,328,944 (Attarwala)), or certain sulfur-containing compounds, such as a sulfinate, a cyclic sultinate naphthosultone compound substituted with at least one strong electron withdrawing group at least as strongly electron withdrawing as nitro (U.S. Pat. No. 5,424,343 (Attarwala)), and alkylating agents such as polyvinyl benzyl chloride, 4-nitrobenzyl chloride, and combinations thereof, silylating agents, and combinations thereof (U.S. Pat. No. 6,093,780 (Attarwala)), the disclosures of each of which are hereby incorporated herein by reference]. Such additives therefore may be selected from certain acidic materials (like citric acid), thixotropy or gelling agents, thickeners, dyes, thermal degradation resistance enhancers, and combinations thereof. See e.g. U.S. patent application Ser. No. 11/119,703 and U.S. Pat. Nos. 5,306,752, 5,424,344 and 6,835,789, the disclosures of each of which are hereby incorporated herein by reference.

These other additives may be used in the inventive compositions individually in an amount from about 0.05% to about 20%, such as about 1% to 15%, desirably 5% to 10% by weight, depending of course on the identity of the additive. For instance, and more specifically, citric acid may be used in the inventive compositions in an amount of 5 to 500 ppm, desirably 10 to 100 ppm.

A particularly desirable additive package for use in the invention toughened cyanoacrylate compositions includes the combination of two or more of citric acid, phthalic anhydride and crown ether, desirably all three. See below Example 6, Tables 12 and 13.

As a general guide, for radiation curable cyanoacrylate compositions including the rubber toughening components having (a) reaction products of the combination of ethylene, methyl acrylate and monomers having carboxylic acid cure sites, (b) dipolymers of ethylene and methyl acrylate, and combinations of (a) and (b), which once the reaction products and/or dipolymers are formed are then substantially free of processing aids, such as octadecyl amine, complex organic phosphate esters, stearic acid and/or polyethylene glycol ether wax and anti-oxidants, such as substituted diphenyl amine, it is desirable to include a metallocene, such as ferrocene, in an amount within the range of about 0.005% to about 4% or greater (desirably within the range of about 0.01% to about 1.5%) by weight of the total composition and a photoinitiator, such as "IRGACURE" 1700 or 819, or "DAROCUR" 1173, in an amount within the range of about 0.125% to about 10% by weight of the composition, with about 2% to about 4% or greater by weight of the total composition being desirable. The rubber toughening component should be used in amount within the range of about 3% to about 20% by weight of the composition, with about 5% to about 15% by weight of the total composition being desirable. The balance of the composition is composed predominantly of a cyanoacrylate component, such as ethyl-2-cyanoacrylate. Of course, the amount of all the components together in the composition totals 100%.

In another aspect of the invention, there is provided a method of bonding together two substrates, which method includes applying to at least one of the substrates a composition as described above, and thereafter mating together the substrates for a time sufficient to permit the adhesive to fixture. For many applications, the substrate should become fixed by the inventive compositions in less than about 150 seconds, and depending on the substrate as little as about 30 seconds. In addition, the inventive composition should develop shear strength on the substrates between which they have been applied, as well as side impact strength and fracture toughness.

In that aspect of the invention relating to radiation curable toughened cyanoacrylate compositions, a source of radiation emitting electromagnetic waves is used to effect cure and may be selected from ultraviolet light, visible light, electron beam, x-rays, infrared radiation and combinations thereof. Desirably, ultraviolet light is the radiation of choice, with appropriate sources including "H", "D", "V", "X", "M" and "A" lamps, mercury arc lamps, and xenon arc lamps (such as those commercially available from Henkel Corporation, Rocky Hill, Conn., Fusion UV Curing Systems, Buffalo Grove, Ill. or Spectroline, Westbury, N.Y.); microwave-generated ultraviolet radiation; solar power and fluorescent light sources. Any of these electromagnetic radiation sources may use in conjunction therewith reflectors and/or filters, so as to focus the emitted radiation onto a specific portion of a substrate onto which has been dispensed a photocurable composition and/or within a particular region of the electromagnetic spectrum. Similarly, the electromagnetic radiation may be generated directly in a steady fashion or in an intermittent fashion so as to minimize the degree of heat build-up. Although the electromagnetic radiation employed to cure the photocurable compositions into desired reaction products is often referred to herein as being in the ultraviolet region, that is not to say that other radiation within the electromagnetic spectrum may not also be suitable. For instance, in certain situations, radiation in the visible region of the electromagnetic spectrum may also be advantageously employed, whether alone or in combination with, for instance, radiation in the ultraviolet region. Of course, microwave and infrared radiation may also be advantageously employed under appropriate conditions.

Higher or lower radiation intensities, greater or fewer exposures thereto and length of exposure and/or greater or lesser distances of the source of radiation to the composition may be required to complete curing, depending of course on the particular components of a chosen composition.

More specifically with respect to radiation intensity, the chosen lamp should have a power rating of at least about 100 watts per inch (about 40 watts per cm), with a power rating of at least about 300 watts per inch (about 120 watts per cm) being particularly desirable. Also, since the inclusion of a photoinitiator in the composition may shift the wavelength within the electromagnetic radiation spectrum at which cure occurs, it may be desirable to use a source of electromagnetic radiation whose variables (e.g., wavelength, distance, and the like) are readily adjustable.

During the radiation curing process, the inventive composition may be exposed to a source of electromagnetic radiation that emits an amount of energy, measured in $KJ/m^2$, determined by parameters including: the size, type and geometry of the source; the duration of the exposure to electromagnetic radiation; the intensity of the radiation (and that portion of radiation emitted within the region appropriate to effect curing); the absorbency of electromagnetic radiation by any intervening materials, such as substrates; and the distance the composition lies from the source of radiation. Those persons of skill in the art should readily appreciate that curing of the composition may be optimized by choosing appropriate values for these parameters in view of the particular components of the composition.

Commercially available curing systems, such as the "ZETA" 7200 or 7400 ultraviolet curing chamber (Henkel Corporation, Rocky Hill, Conn.), Fusion UV Curing Systems F-300 B (Fusion UV Curing Systems, Buffalo Grove, Ill.), Hanovia UV Curing System (Hanovia Corp., Newark, N.J.), BlackLight Model B-100 (Spectroline, Westbury, N.Y.) and RC500 A Pulsed UV Curing System (Xenon Corp., Woburn, Mass.), are well-suited for the purposes described herein. Also, a Sunlighter UV chamber fitted with low intensity mercury vapor lamps and a turntable may be employed herein.

In yet another aspect of the invention, there is provided reaction products of the so-described compositions.

In still another aspect of the invention, there is provided a method of preparing the so-described compositions. The method includes providing a cyanoacrylate component, and combining therewith with mixing a rubber toughening agent.

In a further aspect of the invention, there is provided a method of conferring one or more of the following properties to rubber toughened cyanoacrylate compositions improved fixture speed, improved shear strength development over time, and improved fracture toughness, which method includes the steps of providing a cyanoacrylate composition, providing a rubber toughening agent of (a) reaction products of the combination of ethylene, methyl acrylate and monomers having carboxylic acid cure sites, (b) diploymers of ethylene and methyl acrylate, and combinations thereof, and being substantially free of processing acids and/or anti-oxidants, and mixing together the cyanoacrylate compositions and rubber toughening agents.

These aspects of the invention will be further illustrated by the examples which follow.

EXAMPLES

Example 1

A number of samples were evaluated for their fixture speeds on a variety of substrates and shelf lives under accelerated aging conditions. The samples evaluated included LOCTITE BLACK MAX 380, LOCTITE 4203, LOCTITE 4204, LOCTITE 4205, LOCTITE BLACK MAX 480, and Sample Nos. 1-9, where the first five samples—labeled as Sample A-E, respectively, are provided for comparative purposes.

Sample Nos. 1-9 were prepared by mixing together the noted constituents for a sufficient period of time to ensure substantial homogeneity of the constituents. Ordinarily, about 30 minutes should suffice, depending of course on the quantity of the constituents used. The constituents and amounts of LOCTITE BLACK MAX 380 (Sample A), LOCTITE 4203 (Sample B), LOCTITE 4204 (Sample C), LOCTITE 4205 (Sample D), LOCTITE BLACK MAX 480 (Sample E), and Sample Nos. 1, 2 and 3 are given in Tables 1a and 1b; Sample Nos. 4-6 are given in Table 1c; and Sample Nos. 7-9 are given in Table 1d.

TABLE 1a

| Component | | Sample | | | | |
|---|---|---|---|---|---|---|
| Type | Identity | A | B | C | D | E |
| CA | Ethyl-2-CA | 60-100 | 60-100 | 60-100 | 60-100 | 60-100 |
| Rubber | VAMAC B-124 | 10 | — | — | — | 10 |
| Toughening Agent | VAMAC G | — | 8 | 8 | 8 | — |
| Accelerator | Tetrabutyl tetra(2-ethoxy-2-oxoethoxy)calix(4)arene | — | 0.5 | 0.5 | 0.5 | |
| Stabilizer | MSA/SO$_2$ | 0.012 | 0.005 | 0.005 | 0.005 | — |
| | BF$_3$ | — | — | — | — | 0.005 |
| | HQ | 0.3 | 0.3 | 0.3 | 0.3 | 0.5 |
| Filler | Carbon Black | 1-5 | — | — | — | 1-5 |
| | Silica | — | 1 | 2 | 6 | — |

Samples B-D also contain phthalic anhydride, ethylene sulfite and bismaleimide (at a level of 1-5 weight percent). Samples A and E also contain phthalic anhydride.

TABLE 1b

| Component | | Sample No./Amt. (wt. %) | | |
|---|---|---|---|---|
| Type | Identity | 1 | 2 | 3 |
| CA | Ethyl-2-CA | Balance | Balance | Balance |
| Rubber | VAMAC VCS 5500 | 10 | — | — |
| Toughening Agent | VAMAC G | — | 10 | — |
| | VAMAC B-124 | — | — | 10 |
| Stabilizer | BF$_3$ | 0.00075 | 0.00075 | 0.0045 |

TABLE 1c

| Component | | Sample No./Amt. (wt. %) | | |
|---|---|---|---|---|
| Type | Identity | 4 | 5 | 6 |
| CA | Ethyl-2-CA | Balance | Balance | Balance |
| Rubber | VAMAC VCS 5500 | 8 | — | — |
| Toughening Agent | VAMAC B-124 | — | — | 10 |
| Accelerator | Crown Ether | 0.2 | — | — |
| | Tetrabutyl tetra (2-ethoxy-2-oxoethoxy)calix(4)arene | — | 0.5 | — |
| Stabilizer | BF$_3$ | 0.0005 | 0.0005 | 0.0045 |
| | Polymethylmethacrylate | — | 8.0 | — |
| Other Additives | Citric Acid | 0.0005 | — | — |
| | Phthalic Anhydride | — | — | 0.5 |

TABLE 1d

| Component | | Sample No./Amt. (wt. %) | | |
|---|---|---|---|---|
| Type | Identity | 7 | 8 | 9 |
| CA | Ethyl-2-CA | Balance | Balance | Balance |
| Rubber | VAMAC VCS 5500 | 8 | 8 | 8 |
| Toughening Agent | | | | |
| Accelerator | Crown Ether | 0.15 | 0.15 | 0.20 |
| Stabilizer | BF$_3$ | 0.0005 | 0.0006 | — |
| Filler | Carbon Black | — | 0.1 | — |
| Other Additives | Citric Acid | 0.0005 | 0.0005 | 0.0005 |
| | Phthalic Anhydride | — | — | 0.5 |

Each sample was applied to the substrates listed below in Tables 2a-2d and fixture speeds, bond strengths in terms of peel strength, shear (lap and/or block), side impact strength and fracture toughness, respectively, were measured. For Samples A-E, the data presented is based on published information from Henkel Corporation in Technical Data Sheets.

By way of the background, the fixture speed is the time from joining the two substrates (each of which being about 1 inch wide and being aligned with about a 0.5 inch overlap) sufficient to hold a 3 kg weight.

The lap shear strength was measured using 1"×4"×⅛" metal or plastic substrates, with a 0.5 square inch overlap of the substrates, and the cyanoacrylate sample between the substrate overlap. The cyanoacrylate sample was allowed to cure at room temperature for the time interval as noted in Tables 2b-2d. The resulting bond strength was measured using an Instron instrument.

The side impact strength was measured using 1"×4"×⅛" metal substrates, with a 1 square inch overlap of the substrates, and the cyanoacrylate sample between the substrate overlap. The cyanoacrylate sample was allowed to cure at room temperature for the time interval as noted in Tables 2b-2d. The assembly was then tested using a pendulum impact test fixture to destructively determine the side impact strength.

The fracture toughness was measured according to ASTM 799 by using tapered double cantilever beams ("DCBs") constructed from metallic materials. Cyanoacrylate samples were applied between DCBs with a 0 or 5 mil gap, and cured at room temperature for 8 days. Fracture toughness was measured after that time.

TABLE 2a

| Properties | Substrate | Sample A | B | C | D | E |
|---|---|---|---|---|---|---|
| Fixture Times (secs) | Aluminum | 10-30 | 5-10 | 5-10 | 5-10 | 10-30 |
| | Polycarbonate | 30-90 | — | — | — | 30-90 |
| | ABS | 20-50 | 5-10 | 5-10 | 5-10 | 20-50 |
| | PVC | 50-100 | — | — | — | 50-100 |
| | Stainless Steel | 60-120 | 10-20 | 20-30 | 10-20 | 60-120 |

As noted the data reported in Table 2a is available from Technical Data Sheets published by Henkel Corporation. These data were collected on substrates available at the time of evaluation, which may no longer be in use today because of changes in substrate materials or the processes by which the substrates are manufactured and/or prepared for sale. Thus, the data in the Technical Data Sheets generally is provided simply as a guide to the end user.

TABLE 2b

| Physical Property | | Sample No. 1 | 2 | 3 |
|---|---|---|---|---|
| Stability @82° C. | Days | 27 | 28 | 9 |
| Visc. @25° C. | CPs | 220 | 237 | 200 |
| Fixture Time (sec) | Steel | 140 | >300 | >300 |
| | Al | 30 | 45 | 50-60 |
| | Pine | 30 | 60 | >300 |
| Side Impact (RTC) (Joules) | Steel 24 hr | 10.0 | 3.5 | 8.0 |
| | Al 24 hr | 8.0 | 1.0 | 6.0 |
| Fracture Toughness (J/cm$^2$) | 0 mil | 816 | 730 | 850 |
| | 5 mil | 1823 | 1350 | 0 |

TABLE 2c

| Physical Properties (each in psi) | Time (Hours) | Sample No. 4 | 5 | 6 | 7 |
|---|---|---|---|---|---|
| Steel Lap Shear Strength | 1 | 251 | 131 | 34.7 | 269 |
| | 2 | 787 | 715 | 407 | 1073 |
| | 4 | 1795 | 1207 | 1541 | 1699 |
| | 6 | 1867 | 1225 | 1493 | 1798 |
| | 24 | 2171 | 1769 | 2116 | 2112 |
| | 72 | 2283 | 1975 | 2345 | — |
| Aluminum Lap Shear Strength | 0.5 | 524 | 359 | 61 | 425 |
| | 1 | 932 | 373 | 477 | 842 |
| | 2 | 1217 | 441.1 | 964 | 1085 |
| | 4 | 1533 | 498 | 1337 | 1430 |
| | 24 | 2062 | 444 | 1450 | 1918 |
| | 72 | 1911 | 715 | 2008 | — |
| PVC Block Shear Strength | 0.5 | 138 | 475 | 0 | 90 |
| | 1 | 523 | 755 | 15 | 377 |
| | 2 | 443 | 765 | 81 | 389 |
| | 4 | 535 | 784 | 128 | 556 |
| | 24 | 788 | 804 | 339 | 786 |
| G-10* Lap Shear Strength | 0.5 | 977 | 1001 | 31 | — |
| | 1 | 1617 | 1218 | 13 | — |
| | 2 | 2049 | 1945 | 41 | — |
| | 4 | 2088 | 2245 | 336 | — |
| | 24 | 2364 | 2427 | 923 | — |
| | 72 | 2619 | 2434 | 1310 | — |

*G-10 = Epoxy electronic circuit board (composite)

Figure 2:
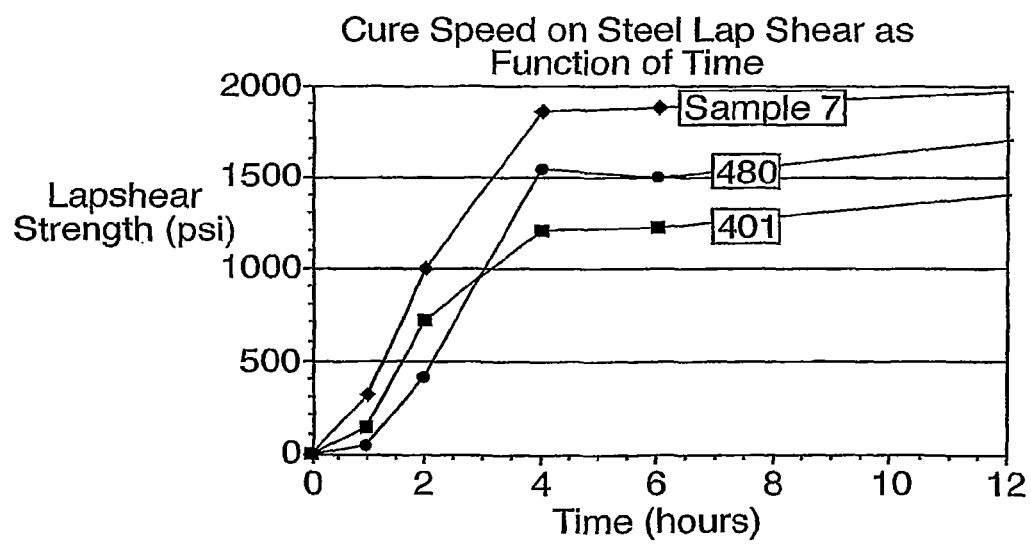
FIG. 2 depicts a plot of the development of lap shear strength overtime for an invention composition compared with two control products on steel substrates.
Figure 3:
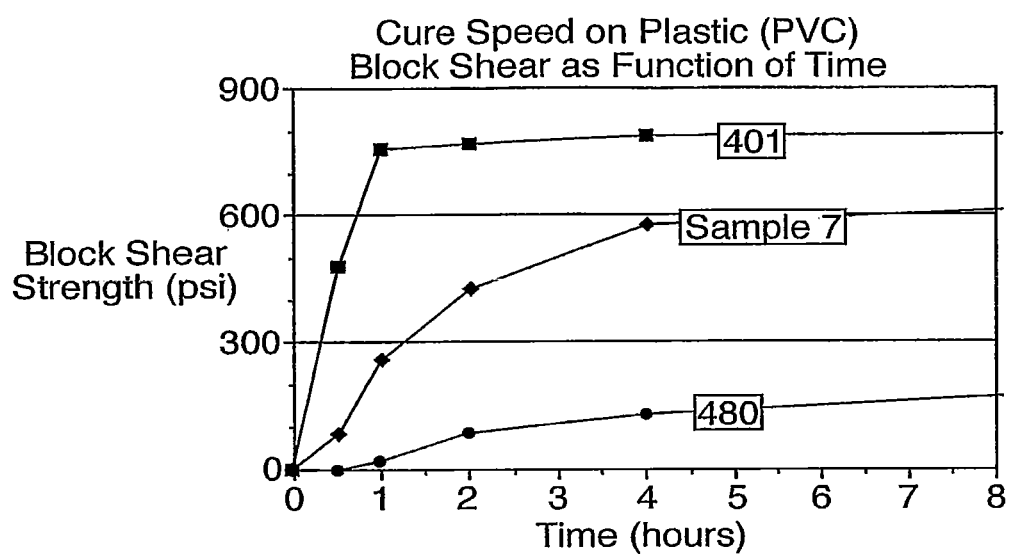
FIG. 3 depicts a plot of the development of lap shear strength overtime for an invention composition compared with two control products on polyvinyl chloride substrates.

Reference may be made to FIGS. 1-3 for a graphic representation of the lap shear strength on aluminum (FIG. 1) and on steel (FIG. 2), and block shear strength on PVC (FIG. 3).

TABLE 2d

| Physical Properties | | Sample No. 7 | 8 | 9 |
|---|---|---|---|---|
| Stability @82° C. | Time (Days) | 18 | 14 | 14 |
| Visc. @25° C. | CPs | 114 | 115 | 130 |
| Lap Shear (psi) | Al-PVC 24 hr RTC | 795* | 799* | 791* |
| | Al-Al 24 hr RTC | 2112 | 2189 | 2307 |
| Fixture Time (sec) | Steel | 40 | 55 | 35 |
| | Al | 4 | 5 | 5 |
| | Pine | 93 | 105 | 95 |
| | G-10 | 132 | 165 | 115 |
| Lap Shear (psi) Steel [Grit Blasted] | 48 hr RTC | 2789 | 2648 | 2897 |
| | 24 hr RTC, 24 hr @ 120° C., Rtpull | 3305 | 3264 | 3697 |
| | 24 hr RTC, 48 hr @ 120° C., Rtpull | 2808 | 3029 | 3551 |
| 180° Peel (lbf/in) | 48 hr RTC | 19.0 | 24.4 | 26.0 |

*PVC substrate failure

Example 2

In this example, three VAMAC-brand rubbers, VMX 1012, VCS 5500 and VCS 5520, were dissolved in ethyl cyanoacrylate monomer to formulate cyanoacrylate compositions. The difference in constituents between these two VAMAC-brand rubbers from other commercially available ones (i.e., VAMAC G and VAMAC B-124) is shown below in Table 3. Like VAMAC VCS 5500, VMX 1012 and VCS 5520 are substantially free of processing aids such as the release agents octadecyl amine, complex organic phosphate esters and/or stearic acid, and anti-oxidants, such as substituted diphenyl amine. Unlike VAMAC 5500, VMX 1012 is free of acid cure sites, and VCS 5520 is believed to contain about half the amount of total acid cure sites found in VAMAC G and B-124.

TABLE 3

| Ingredients used to make VAMAC rubber | VMX 1012 | VCS 5520 | VCS 5500 | VAMAC G | VAMAC B-124 |
|---|---|---|---|---|---|
| Ethylene | x | x | X | x | x |
| Methyl acrylate | x | x | X | x | x |
| Monomers having carboxylic acid cure sites | — | x, 2 wt. % | x, 4 wt. % | x, 4 wt. % | x, 4 wt. % |
| Internal release aid (Carbowax/Nargard/Polygaurd) | — | — | — | x | x |
| Carbon black | — | — | — | — | x, 2 wt. % |

For comparative purpose, the VAMAC-brand rubbers identified in Table 3 were each mixed with ethyl cyanoacrylate monomer in the presence of BF$_3$ as the stabilizer, as shown in Table 4 to form Sample Nos. 10-11.

TABLE 4

| Components Type | Identity | Sample No. 10 | 11 |
|---|---|---|---|
| Cyanoacrylate | Ethyl-2-CA | Balance | Balance |
| Rubber Toughening | VAMAC VMX 1012 | 10 | — |

TABLE 4-continued

| Components | | Sample No. | |
|---|---|---|---|
| Type | Identity | 10 | 11 |
| Agent | VAMAC VCS 5520 | — | 10 |
| Stabilizer | BF$_3$ | 0.00075 | 0.00075 |

Referring below to Table 5, stability of the so formed compositions was determined after accelerated ageing in aluminum tubes at a temperature of 82° C. By using VMX 1012 and VCS 5520, the cyanoacrylate compositions prepared therewith were determined to be shelf stable for 15 and 20 days, respectively. Sample Nos. 1 and 2 (see Tables 1a and 1b) containing VAMAC VCS 5500 and G, respectively, showed stability of 27 and 28 days, respectively. In addition, a faster fixture time was observed for Sample Nos. 10 and 11 (prepared with VAMAC VMX 1012 and VCS 5520, respectively) on substrates, like aluminum, as compared to Sample Nos. 1 and 2 (prepared with VAMAC G and B-124, respectively).

TABLE 5

| | Sample No. | |
|---|---|---|
| Properties | 10 | 11 |
| Stability @82° C. (days) | 15 | 20 |
| Visc. @25° C. (cPs) | 171 | 183 |
| Fixture time (secs) - Aluminum | 10 | 10 |
| Fixture time (secs) - Mild Steel | 180 | 160 |

Example 3

In this example, two VAMAC-brand rubbers, VMX 1012 and VCS 5520, were dissolved in ethyl cyanoacrylate monomer to formulate cyanoacrylate compositions for a comparison to LOCTITE PRISM 480 (Sample E) as a control. Table 6 below shows the formulation constituents of each sample.

TABLE 6

| Component | | Sample No. | | |
|---|---|---|---|---|
| Type | Identity | 12 | 13 | 14 |
| Cyanoacrylate | Ethyl-2-CA | Balance | Balance | Balance |
| Rubber | VAMAC VMX 1012 | 8 | — | — |
| Toughening Agent | VAMAC VCS 5520 | — | 8 | 8 |
| Stabilizer | BF$_3$ | 0.001 | 0.0002 | 0.0001 |
| Accelerator | Crown ether | 0.2 | — | 0.2 |
| Other additives | Citric acid | 0.005 | 0.005 | 0.005 |
| | Phthalic anhydride | 0.5 | 0.5 | 0.5 |

Referring below to Table 7, stability of the so formed cyanoacrylate compositions was again determined after accelerated ageing in aluminum tubes at a temperature of 82° C. By using VAMAC VMX 1012 and VCS 5520, the cyanoacrylate compositions were determined to be shelf stable for at least 10 days under the test conditions, which is an improvement over the control. In addition, a faster fixture time was observed for Sample Nos. 12 and 14 (prepared with VAMAC VMX 1012 and VCS 5520, respectively) on substrates, like mild steel, aluminum, G-10 and pine, as compared to the control. And after a 72 hour cure, the block shear strength of each of Sample Nos. 12-14 was greater than that of the control on substrates, like PVC, G-10 and phenolic.

TABLE 7

| | Sample No. | | | |
|---|---|---|---|---|
| Properties | 12 | 13 | 14 | E |
| Stability @82° C. (days) | 10 | 18 | 16 | 9 |
| Fixture time (sec) | | | | |
| Mild Steel | 60 | — | 60 | 100-110 |
| Aluminum | 5 | — | 5 | 25 |
| G-10 | 45 | — | 90 | >300 |
| Pine | 84 | — | 90 | >300 |
| Block strength (psi), 24 hour cure | | | | |
| PVC | 689 | 398 | 508 | 182 |
| G-10 | 1810 | 2026 | 1366 | 1620 |
| Phenolic | 588 | 368 | 571 | 170 |
| Polycarbonate | 541 | 488 | 488 | 139 |
| Block strength (psi), 72 hour cure | | | | |
| PVC | 663 | 768 | 727 | 353 |
| G-10 | 2315 | 2275 | 2282 | 2168 |
| Phenolic | 854 | 719 | 718 | 517 |

Example 4

In this example, two VAMAC-brand rubbers, VAMAC VMX 1012 and VCS 5520, were dissolved in ethyl cyanoacrylate monomer to formulate cyanoacrylate compositions for a comparison to LOCTITE PRISM 480 and LOCTITE FLASHCURE 4305, as controls. Table 8 below shows the formulation constituents of each sample.

Photoinitiators IRGACURE 819 and DAROCUR 1173 from Ciba Specialty Chemicals, as well as LUCIRIN TPO-L from BASF—and a metallalocene component—ferrocene (at a level of 100 ppm)—were used in the compositions in this example, and BF$_3$ was used as a stabilizer. The VAMAC rubbers along with other ingredients (see below Table 8) were mixed with ethyl cyanoacrylate for about 30 minutes to form a substantial homogeneous composition.

TABLE 8

| Component | | Sample No./Amt. (Wt. %) | | | | |
|---|---|---|---|---|---|---|
| Type | Identity | 15 | 16 | 17 | 18 | 19 |
| Monomer | Ethyl-2-CA | Balance | Balance | Balance | Balance | Balance |
| Rubber Toughening Agent | VAMAC VCS 5500 | 9.8 | 9.8 | — | — | — |
| | VAMAC VMX 1012 | — | — | 5 | 8 | 9.8 |
| Stabilizer | BF$_3$ | 0.003 | 0.003 | 0.003 | 0.003 | 0.004 |
| Photoinitiator | IRGACURE 819 | — | — | 0.5 | 0.5 | 0.5 |
| | LUCIRIN TPO-L | 0.5 | — | — | — | — |
| | DAROCUR 1173 | — | 2 | — | — | — |
| Metallocene | Ferrocene | 0.01 | 0.01 | 0.01 | 0.01 | 0.01 |

Referring below to Table 9, good shelf-life stability was obtained with Sample Nos. 15-19 made with the VAMAC rubbers VAMAC VCS 5500 and VAMAC VMX 1012. These samples show shelf-life stability, when measured by accelerated ageing studies.

A drop of each sample was dispensed onto a glass slide, and then exposed to UV light (30 mW/cm² at 365 nm). A tack free surface was observed to form within 5 and 3 seconds for Sample Nos. 17 and 18, respectively.

Lap shear strength on grit blasted steel for each sample made from the VAMAC rubber VAMAC VCS 5500 and VAMAC VMX 1012 (which were allowed to cure for 48 hours at room temperature) was evaluated and found to be in the range of about 2,000-3,500 psi, depending on the specified compositions. In addition, block strength strength on polycarbonate substrates after a 10 second UV-exposure is also presented in Table 9 for Sample Nos. 17 and 18. The data in Table 9 illustrates that good bonding strength can be obtained by using the formulations made with VAMAC rubbers.

An evaluation of Sample No. 20 was performed in accordance with ASTM D5045 (the substance of which is hereby incorporated herein by reference) using three-point bend specimen geometry. The mold used to prepare the sample for evaluatuon is constructed from glass, with a Teflon film placed therwithin. The glass mold is transmissive to UV radiation to permit curing of the sample by exposure to such radiation. The Teflon permits the film formed after exposure to be removed in a self supporting manner. Thus, the mold with the sample within was exposed to UV radiation at an intensity of 30 mW/cm² at 365 nm for about 1-2 minutes for each side. Table 11 below presents the $G_q$ (critical strain energy release rate) and $K_q$ (plane-strain fracture toughness) values obtained from that evaluation.

TABLE 9

| Physical Properties | Sample Nos. | | | | |
| --- | --- | --- | --- | --- | --- |
|  | 15 | 16 | 17 | 18 | 19 |
| Stability @82° C. (days) | 9 | 8 | 8 | 7 | 9 |
| Viscosity @25° C. (cP) | — | — | 26 | 109 | 171 |
| Tack free (secs) | — | — | 5 | 3 | — |
| Lap shear (psi), steel grit blasted, 48 hrs cure | 3474 | 3109 | 2259 | 2135 | — |
| PC block strength (Psi), 10 sec UV cure @ 30 mw/cm² of 365 nm, tested within 2 minutes | — | — | 1269 | 1798 | — |
| PC block strength (Psi), 10 sec UV cure @ 30 mw/cm² of 365 nm, tested after 24 hrs RT Cure | — | — | — | 3675 | — |

Example 5

In this example, fracture toughness was evaluated for a radiation curable cyanoacrylate composition toughened in accordance with the present invention.

Reference to Table 10 shows the identity and amounts of constituents used in Sample No. 20.

TABLE 10

| Component | | Sample No./Amt. (Wt %) |
| --- | --- | --- |
| Type | Identity | 20 |
| Cyanoacrylate | Ethyl-2-CA | Balance |
| Rubber Toughening Agent | VAMAC VCS 5500 | 9.8 |
| Stabilizer | BF₃ | 0.003 |
| Photoinitiator | IRGACURE 819 | 0.5 |
| Metallocene | Ferrocene | 0.01 |

TABLE 11

| Three-Point Bend Results | | Sample No. 20 |
| --- | --- | --- |
| $G_q$ | J/cm² | 2873.1 |
| $K_q$ | MPa · m^{1/2} | 1.25 |

Example 6

In this example, Sample Nos. 21-27 were prepared with VAMC VCS 5500 as the rubber toughening component, together with various additives, as shown below in Table 12.

TABLE 12

| Component | | Sample No./Amt. (wt. %) | | | | | | |
| --- | --- | --- | --- | --- | --- | --- | --- | --- |
| Type | Identity | 21 | 22 | 23 | 24 | 25 | 26 | 27 |
| CA | Ethyl-2-CA | Balance | Balance | Balance | Balance | Balance | Balance | Balance |
| Rubber Toughening Agent | VAMAC VCS 5500 | 8 | 8 | 8 | 8 | 8 | 8 | 8 |
| Stabilizer | BF₃ | 0.0005 | 0.0005 | 0.0005 | 0.0005 | 0.0005 | 0.0005 | 0.0005 |
| Accelerator | Crown Ether | — | — | — | 0.2 | 0.2 | 0.2 | 0.20 |

TABLE 12-continued

| Component | | Sample No./Amt. (wt. %) | | | | | | |
|---|---|---|---|---|---|---|---|---|
| Type | Identity | 21 | 22 | 23 | 24 | 25 | 26 | 27 |
| Other Additives | Citric Acid | 0.0005 | 0.0008 | — | 0.0005 | 0.0008 | — | 0.0005 |
| | Phthalic Anhydride | — | — | 0.5 | — | — | 0.5 | 0.5 |

Table 13 below shows the results of certain evaluations made on Sample Nos. 21-27. For instance, side impact and lap shear data are recorded in the table. The lap shear data for Sample No. 27 was obtained from a sample with 2 ppm $BF_3$, instead of 5 ppm as was used for the side impact data.

TABLE 13

| Physical Properties | | Sample No./Amt. (wt. %) | | | | | | |
|---|---|---|---|---|---|---|---|---|
| | | 21 | 22 | 23 | 24 | 25 | 26 | 27 |
| Side Impact, RTC (Aluminum) (Joules) | 24 hour | 7.2 | 5.2 | 1.9 | 7.8 | 6.9 | 1.7 | 7.9 |
| | 2 week | 6.6 | 5.2 | 1.6 | 7.5 | 4.6 | 1.9 | 9.7 |
| | 4 week | 5.9 | 4.7 | 1.9 | 6.4 | 4.4 | 1.5 | 9.6 |
| | 8 week | 4.7 | 3.7 | 1.6 | 5.7 | 3.3 | 1.5 | 8.0 |
| Lap shear, 24 hr RTC, heating aging @121 C. and RT Pull [Steel, grit blasted] (psi) | 24 hour | 4307 | 3687 | — | 3113 | 3260 | — | 3805 |
| | 2 week | 2429 | 1681 | — | 2511 | 2389 | — | 2736 |
| | 4 week | 798 | 1375 | — | 1883 | 2006 | — | 2559 |
| | 8 week | 0 | 430 | — | 310 | 810 | — | 2003 |

What is claimed is:

1. A rubber toughened cyanoacrylate adhesive composition, comprising:
    (a) a cyanoacrylate component;
    (b) a rubber toughening agent consisting essentially of (i) reaction products of the combination of ethylene, methyl acrylate and monomers having carboxylic acid cure sites, and (ii) combinations of (a) and dipolymers of ethylene and methyl acrylate, being substantially free of release agents, anti-oxidants, stearic acid and polyethylene glycol ether wax;
    (c) N,N'-meta-phenylene bismaleimide; and
    (d) phthalic anhydride.

2. The composition according to claim 1, further comprising a filler.

3. The composition according to claim 2, wherein the filler is selected from the group consisting of carbon black, silica and combinations thereof.

4. The composition of claim 1, further comprising a stabilizing amount of an acidic stabilizer and a free radical inhibitor.

5. The composition of claim 1, wherein the concentration of the rubber toughening agent is from about 1.5% to about 20% by weight.

6. The composition according to claim 1, wherein the cyanoacrylate component is selected from materials within the structure $H_2C=C(CN)-COOR$, wherein R is selected from $C_{1-15}$ alkyl, alkoxyalkyl, cycloalkyl, alkenyl, aralkyl, aryl, allyl and haloalkyl groups.

7. The composition according to claim 1, further comprising an accelerator component selected from the group consisting of calixarene, oxacalixarene, silacrown, cyclodextrin, crown ether, poly(ethyleneglycol) di(meth)acrylate, ethoxylated hydric compound, and combinations thereof.

8. The composition according to claim 1, further comprising additives selected from the group consisting of shock resistant additives, thixotropy conferring agents, thickeners, dyes, and combinations thereof.

9. The composition according to claim 8, wherein the shock resistant additive is citric acid.

10. Reaction products of the composition according to claim 1.

11. A method of bonding together two substrates, comprising the steps of:
    applying a cyanoacrylate-containing adhesive composition according to claim 1, to at least one of the substrates and
    mating together the substrates for a time sufficient to permit the adhesive to fixture.

12. A method of preparing a cyanoacrylate-containing composition according to claim 1, comprising the steps of:
    providing a cyanoacrylate component, N,N'-meta-phenylene bismaleimide, and phthalic anhydride and
    combining therewith with mixing a rubber toughening agent consisting essentially of (a) reaction products of the combination of ethylene, methyl acrylate and monomers having carboxylic acid cure sites, (b) dipolymers of ethylene and methyl acrylate, and combinations of (a) and (b), and being substantially free of release agents, anti-oxidants, stearic acid and polyethylene glycol ether wax.

13. The composition according to claim 1, further comprising a thermal degradation resistance enhancer selected from the group consisting of mono, poly or hetero aromatic compounds characterized by at least three substitutions on an aromatic ring thereof, two or more of which being electron withdrawing groups, quinoid compounds, sulfur-containing compounds, cyclic sultanate naphthosultone compounds substituted with at least one strong electron withdrawing group at least as strongly electron withdrawing as nitro, alkylating agents, silylating agents, and combinations thereof.

14. The composition according to claim 13, wherein the thermal degradation resistance enhancer is selected from the group consisting of an anhydrosulfite, a sulfoxide, a sulfite, a sulfonate, a methanesulfonate, a p-toluenesulfonate, polyvinyl benzyl chloride, 4-nitrobenzyl chloride, and combinations thereof.

* * * * *

UNITED STATES PATENT AND TRADEMARK OFFICE
CERTIFICATE OF CORRECTION

| | |
|---|---|
| PATENT NO. | : 9,944,830 B2 |
| APPLICATION NO. | : 15/291371 |
| DATED | : April 17, 2018 |
| INVENTOR(S) | : Shabbir Attarwala et al. |

It is certified that error appears in the above-identified patent and that said Letters Patent is hereby corrected as shown below:

In the Specification

Column 4, Line 24, change "VANFRE VAN" to --VANFRE VAM--

Column 6, Line 56, change "the these" to --all these--

Signed and Sealed this
Twenty-third Day of July, 2019

Andrei Iancu
*Director of the United States Patent and Trademark Office*